United States Patent [19]

Schwerin et al.

[11] 4,069,746
[45] Jan. 24, 1978

[54] CONTROL ARRANGEMENT FOR A HYDRAULIC POWER TRANSMISSION

[75] Inventors: Günter Schwerin, Moglingen; Werner Reitz, Ottersweier, both of Germany

[73] Assignee: Robert Bosch GmbH, Stuttgart, Germany

[21] Appl. No.: 781,460

[22] Filed: Mar. 25, 1977

[30] Foreign Application Priority Data

Apr. 17, 1976 Germany .............................. 2617008

[51] Int. Cl.² .......................... F15B 13/04; F15B 13/06
[52] U.S. Cl. ........................................ 91/448; 60/484; 60/494
[58] Field of Search .................. 91/444, 448, 462, 374, 91/378, 388; 60/484, 477, 494

[56] References Cited

U.S. PATENT DOCUMENTS

| | | | |
|---|---|---|---|
| 2,012,273 | 8/1935 | Fraser | 91/448 X |
| 3,583,285 | 6/1971 | Johnson | 91/444 X |

*Primary Examiner*—Edgar W. Geoghegan
*Attorney, Agent, or Firm*—Michael J. Striker

[57] ABSTRACT

A control arrangement for a hydraulic power transmission comprises a main valve slide, a precontrol valve slide for controlling the main valve slide, as well as an auxiliary valve slide for controlling flow of pressure fluid through a pressure channel leading from a pump to a hydraulic consumer, for instance to fluid operated cylinder and piston means. The arrangement includes further a control conduit branching off from the pressure channel and leading over a throttle, the precontrol valve slide and the auxiliary valve slide, in which the latter is movable between two end positions under the influence of a spring and the hydraulic pressure in a pressure chamber and arranged to control passage of fluid through the control conduit, and two adjustable throttles in the control conduit, respectively formed by the auxiliary valve slide and the precontrol valve slide. The various elements of the control arrangement are constructed and connected to each other to avoid under all operating conditions a throttling action causing the pump to work against an excessively high pressure.

8 Claims, 4 Drawing Figures

CONTROL ARRANGEMENT FOR A HYDRAULIC POWER TRANSMISSION

BACKGROUND OF THE INVENTION:

The present invention relates to a control arrangement for a hydraulic power transmission, comprising a main valve slide, a precontrol valve slide to control the main valve slide, as well as an auxiliary valve slide for controlling flow of pressure fluid through a pressure channel leading from a pump to a hydraulic consumer. The arrangement includes further a control conduit branching off from the pressure channel and leading over a throttle, the precontrol valve slide and the auxiliary valve slide, in which the latter is movable between two end positions under the influence of a spring and the hydraulic pressure in a pressure chamber and arranged to control the control conduit, and two adjustable throttles in the control conduit respectively formed by the auxiliary valve slide and the precontrol valve slide. In a control arrangement known in the art, the auxiliary valve slide is arranged to control release of pressure fluid from a control chamber coordinated with the main valve slide. The known arragement aims to prevent, by fast movement of the auxiliary valve slide, the occurrence of such a throttling action that the amount of oil pumped by the pump can, at corresponding pressure conditions, just pass the release openings so that the pump has to operate against an excessively high pressure. Such an operation, called for short "arresting throttling", can quickly lead to a destruction of the pump. Whereas in the known control arrangement such an arresting throttling is avoided during increase of pressure in the pressure channel, that is during shifting of the precontrol valve slide from a neutral position to a lifting position, it is possible that during reverse shifting of the precontrol slide conditions may arise which will produce such an arresting throttling action. The known arrangement has further the disadvantage that various dimensions of bores and control edges of the elements of the control arrangement are in a critical relationship with respect to each other, which in turn requires that these elements are constructed to very close tolerances.

SUMMARY OF THE INVENTION

It is an object of the present invention to provide a control arrangement of the aforementioned kind which is constructed in such a manner that an arresting throttling action is positively prevented under all operating conditions.

It is a further object of the present invention to provide a control arrangement of the aforementioned kind which is of relatively simple construction so that it can be produced at reasonable cost and will stand up trouble-free under extended use.

These objects of the present invention are obtained in that in the control arrangement of the invention the adjustable throttles are arranged in the control conduit in such a manner that they will act in opposite directions and that a section of the control conduit between the two adjustable throttles communicates with the aforementioned pressure chamber.

This will assure that an arresting throttling action will not only be avoided during increase of the pressure in the pressure channel, that is during switching from a neutral position to a lifting position, but also during decrease of pressure in the pressure channel, that is by shifting in the reverse direction. The auxiliary valve slide may thereby act in the pressure build-up phase above a predetermined operating pressure as a pressure switch and in the pressure reducing phase as a fluid stream regulating slide.

A further advantage of the control arrangement of the invention is that it can be built at reasonable cost, especially due to the fact that the various elements need not be manufactured with close tolerances.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
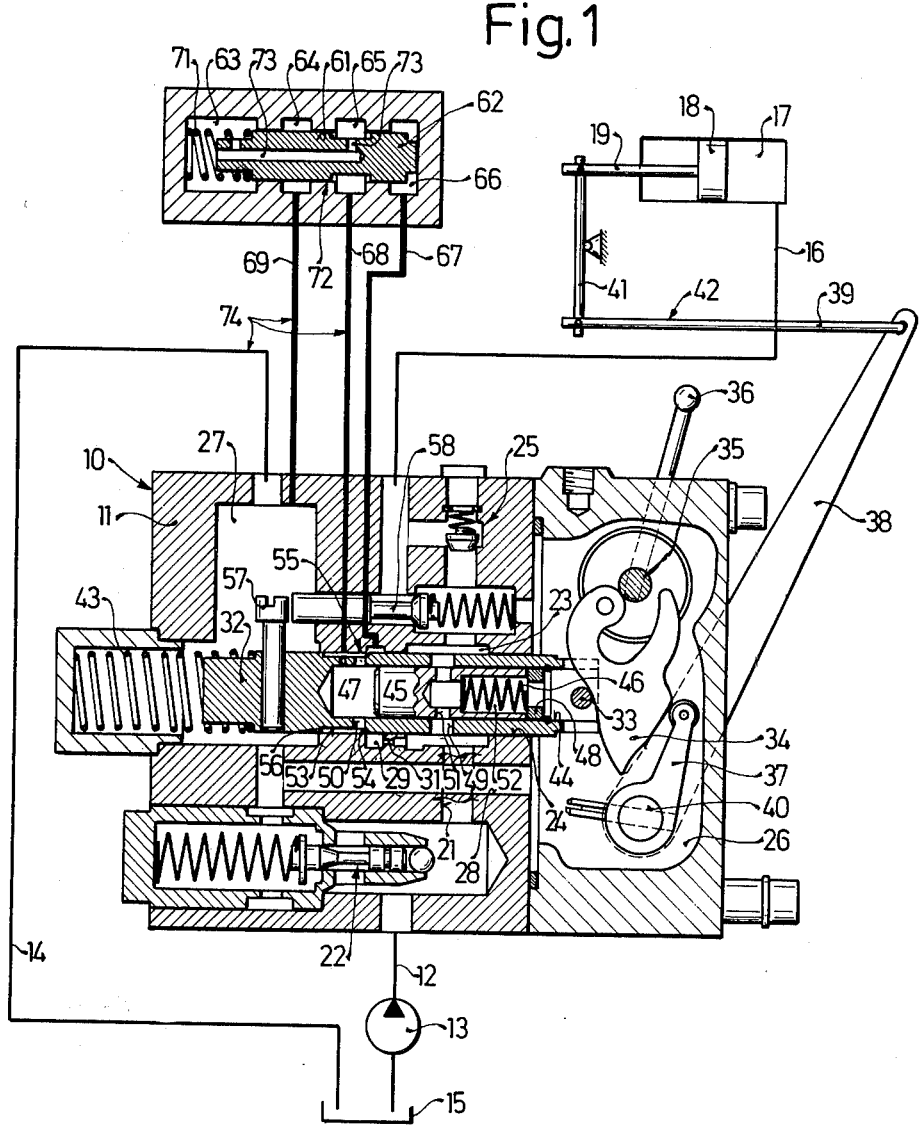
FIG. 1 is a partly section, partly schematic illustration of a first embodiment of the control arrangement of the present invention.

DESCRIPTION OF THE PREFERRED EMBODIMENTS:

Referring now to the drawing, and more specifically to FIG. 1 of the same, it will be seen that the control arrangement 10 for the hydraulic control of a tractor comprises a housing 11 which is connected by a feed conduit 12 with a pump 13, by a return conduit 14 to a tank 15 and by a working conduit 16 to a lifting cylinder 17 of cylinder and piston means 17, 18. A piston 18 is axially movable in the cylinder 17 and operates by means of a piston rod 19, a non-illustrated device.

A pressure channel 21, with which an overpressure valve 22 cooperates, leads in the housing 11 from the feed conduit 12 over a first annular channel 23 to a valve slide bore 24 and over a check valve 25 to the working conduit 16. The right end, as viewed in FIG. 1, of the bore 24 leads to a first chamber 26 and the left end to a second chamber 27, which, on the one hand, communicates with the return conduit 14 and, on the other hand, over a transverse channel 28 with the first chamber 26. Between the first annular chamber 23 about the bore 24 and the second chamber 27 is a second annular chamber 29 provided, which, over a first throttle 31 in the housing 11, communicates with the first annular chamber 23.

A precontrol valve slide 32 is axially movably arranged in the bore 24. The precontrol valve slide 32 carries at its right end, as viewed in FIG. 1, a transverse bolt 33, which abuts against a positioning wedge 34. The positioning wedge 34 is eccentrically connected to a shaft 35, turnably mounted in the housing 11, and the shaft 35 is, outside the housing, connected to a positioning lever 36. A lever 37, cooperating with the positioning wedge 34, is fastened at one end to a second shaft 40, likewise turnably mounted in the housing 11, and an additional lever 38 is connected to the second shaft 40 outside the housing. The lever 37, together with the lever 38, a rod 39 connected to the latter and an intermediate lever 41 between the rod 39 and the piston rod 19 forms a return guide arrangement 42. A spring 43 abuts against the left end, as viewed in FIG. 1, of the precontrol valve slide 32 to thereby hold the bolt 33 abutting against the positioning wedge 34 and the latter, in turn, abutting against a roller carried by the free end of the lever 37.

The precontrol valve slide 32 is provided with a blind bore 44 coaxial therewith and extending from the right end thereof into the latter. A main control valve slide 45 is axially guided in the blind bore 44. The main control valve slide 45 is biased by a spring 46 in direction toward a closing position and is pressed by the fluid pressure in a control chamber 47, formed between the left end of the main control valve slide 45 and the closed end of the blind bore 44 in direction toward an annulus 48 fixedly mounted in the interior of the blind bore 44 in the region of the right end of the precontrol valve slide 32. In the position shown in FIG. 1, crossbores 49 provided in the precontrol valve slide 32 are aligned with corresponding crossbores 51 in the main valve slide 45 to create thereby a non-throttled connection from the first annular chamber 23 to the spring space 52 in the main control valve slide 45 and further to the first chamber 26, and therewith over the transverse channel 28 and the second chamber 29 also to the return conduit 14. This connection is interrupted in the closing position of the main valve slide 45. Crossbores 50 lead from the control chamber 47 into an annular groove 53 provided on the outer peripheral surface of the precontrol valve slide 32.

The annular groove 53 is bound at its right side by a first control edge 54 which cooperates with the second annular chamber 29 and forms a second throttle 55. A second control edge 56 at the left side of the annular groove 53 controls communication of the annular groove 53 with the second chamber 27. The two control edges 54 and 56 are constructed with positive overlapping, and the first control edge 54 provides in the shown neutral position of the precontrol valve slide 32 only a slightly throttled connection between the second annular chamber 29 and the annular groove 53. A follower 57 projecting from the precontrol valve slide 32 into the second chamber 27 cooperates with a valve 58.

The housing 11 is further provided with a second bore 61 in which an auxiliary valve slide 62 is axially movable. This part of the arrangement is only for the purpose of simple illustration flapped over into the drawing plane. Enlargements in the bore 61 from a first pressure chamber 63, a first annular space 64, a second annular space 65 and a second pressure chamber 66. The second pressure chamber 66 is connected with the second annular chamber 29, the second annular space 65 is connected with the first bore 24 in the region of the annular groove 53 and the first annular space 64 is connected with the second chamber 27 respectively by channels 67, 68 and 69. The auxiliary valve slide 62 is pressed by a coil-compression spring 71 into the illustrated first end position. In this position it blocks completely a connection, constructed as a third throttle 72, between the annular spaces 64 and 65. The throttles 55 and 72 are adjustable throttles. Bores 73 in the auxiliary valve slide 62 maintain the first pressure chamber 63 in continuous communication with the second annular space 65.

Control conduit means 74 are thus formed which lead from the pressure channel 21 over the first throttle 31, the second throttle 55, the channel 68, the third throttle 72, the channel 69, the second chamber 27 and the return conduit 14 to the tank 15.

Figure 2:
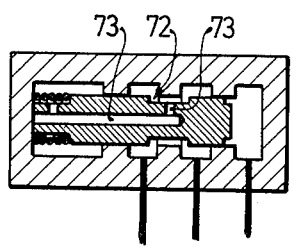
FIG. 2 is a longitudinal section through part of the control arrangement shown in FIG. 1 illustrated in another end position.

The control arrangement 10 illustrates in FIGS. 1 and 2 will operate as follows:

When the various elements of the control arrangement 10 are in the positions as shown in FIG. 1, then the working conduit 16 is closed by the valve 58 and the check valve 25. The pressure medium pumped by the pump 30 passes from the first annular chamber 23 over the first throttle 31, the second annular chamber 29, the only slightly throttled second throttle 55, the annular groove 53 and the crossbores 50 into the control chamber 47. The pressure built up therein holds the main control valve slide 45 against the force of the spring 46 in the illustrated position. In this position, the oil pumped by the pump 13 can pass from the pressure channel 21 over the crossbores 49 in the precontrol valve slide 32, the crossbores 51 in the main control valve slide 45, the spring space 52 therein, the first chamber 26, the transverse channel 28 and the second chamber 27 into the return conduit 14, whereby a relatively low circulation pressure is determined by the spring 46. This circulation pressure acts also, over the channel 67, in the second pressure chamber 66 and in addition, over the channel 68, the second annular space 65 and the bores 73, also in the first pressure chamber 63. Since the end faces of the auxiliary valve slide 62 have the same dimensions, the auxiliary valve slide 62 is held by the spring 71 in its right end position, as shown in FIG. 1.

If the positioning lever 36 is tilted in counter-clockwise direction (lifting direction), the positioning wedge 34 is moved downwardly and moves thereby the precontrol valve slide 32 towards the left, as viewed in FIG. 1. Thereby, the first control edge 54 interrupts the connection between the second annular chamber 29 and the annular groove 53, whereafter the latter is relieved over the second control edge 56 to the second chamber 27. Over the crossbores 50 the pressure in the control chamber 47 can now be reduced to the return flow pressure level. The spring 46 thereafter moves the main control valve slide 45 towards the left, as viewed in FIG. 1, to thereby increasingly throttle circulation of oil from the pump 13 over the crossbores 51 to the tank 15. The pressure in the first annular chamber 23 will thereby increase and therewith also, over the first throttle 31, the second annular chamber 29 and the channel 67, the pressure in the second pressure chamber 66. This pressure, which is still the neutral circulation pressure, can increase only so much as the spring 71 on the auxiliary valve slide 62 will permit. If this pressure surpasses a predetermined value, the auxiliary valve slide 62 will move toward the left, as viewed in FIG. 1, since the pressure in the first pressure chamber 63 is already relieved over the bores 73 in the auxiliary valve slide 62, the channel 68 and the second control edge 56 to the level of the return conduit pressure. FIG. 2 illustrates the auxiliary valve slide 62 in its left end position in which it fully opens the third throttle 72. This in turn will lead to a reduction of the pressure in the control chamber 47, so that the spring 46 moves the main control valve slide 45 to its left end position abutting against the closed end of the blind bore in the precontrol valve slide 32, which in turn leads to a complete interruption of the neutral fluid circulation. The total stream of oil pumped by the pump 13 passes thereby into the cylinder 17 to move the piston 18 therein towards the left.

In this way a so-called arresting throttle action will be avoided, i.e. a slow gradual closing of the crossbore 51 will be prevented.

Therewith it is also impossible that an equilibrium will form during movement of the main control valve slide 45 in which the pump works against load pressure and in which the piston 18 will not move and only a leakage stream will pass to the cylinder 17, whereas the remaining amount of fluid will flow to the tank 15.

During movement of the piston 18 toward the left, as viewed in FIG. 1, the return guide arrangement 42 will tilt the lower lever 37 in clockwise direction. In accordance with this movement, the spring 43 will press the precontrol valve slide 32 towards the right, as viewed in FIG. 1. During this movement, the second control edge 56 will first interrupt the connection to the second chamber 27. Subsequently thereto, the second throttle 55 will open. The auxiliary valve slide 62 will thereby still remain in its left end position, as shown in FIG. 2. At first at still small opening of the second throttle 52, a very small fluid pressure stream will flow over the first throttle 31, the second annular chamber 29, the second throttle 55 and further over the fully open third throttle 72 and the control conduit 74 to the tank 15. The pressure gradient between the load pressure in the first annular chamber 23 and the pressure in the return conduit 14 is developed over the two throttles 31 and 55, whereby in the second annular chamber 29 an intermediate pressure is created which, over the channel 67, acts also in the second pressure chamber 66. Since the piston 18 still moves towards the left, as viewed in FIG. 1, the precontrol valve slide 32 continues to move toward the right and the second throttle 55 opens further. Thereby the intermediate pressure in the second annular chamber 29 and correspondingly the pressure in the second pressure chamber 66 drops further. When this pressure in the second pressure chamber 66 becomes smaller than the pressure of the spring 71, the auxiliary valve slide 62 will move from its left end position shown in FIG. 2 towards the right. Thereby the auxiliary valve slide 62 tries to act as a fluid stream regulating slide for which the second throttle 55 serves as a restrictor. During its movement towards the right, the auxiliary valve slide 62 tries to find a new equilibrium, which would be possible, if the fluid stream passing through the second throttle 55 would increase and therewith the fluid pressure difference acting on the auxiliary valve slide 62 would correspondingly increase. However, the movement of the auxiliary valve slide 62 towards the right will produce just the opposite, that is, it increasingly decreases the flow passage through the third throttle 72, which means that the pressure difference developing over the first and second throttle 31 and 55 will decrease and therewith also the oil stream which passes over the second throttle 55. Therefore, the auxiliary valve slide 62 cannot stop in an intermediate position, but moves rapidly to its right end position, illustrated in FIG. 1, in which the pressures acting in opposite directions thereon are equal. After the third throttle 72 is closed, the control conduit 74 is interrupted and in the control chamber 47 a pressure could be built up equal to the load pressure in the first annular chamber 23. The spring 46 can, however, not counteract such a pressure and the main valve slide 45 moves therefore again back to its relieving position shown in FIG. 1 to restore thereby the low circulation pressure.

The control arrangement 10 will therefore positively prevent an arresting throttling action during the pressure build-up phase, that is during shifting from neutral to lifting (active stroke of the piston 18), as well as during the pressure-reducing phase, that is during shifting in the reverse direction. While the auxiliary valve slide 62 operates in the first case above a predetermined pressure level as a pressure switch, it will act in the second case below that predetermined pressure level like a reversely poled current regulating slide which functions like a toggle switch.

Figure 3:
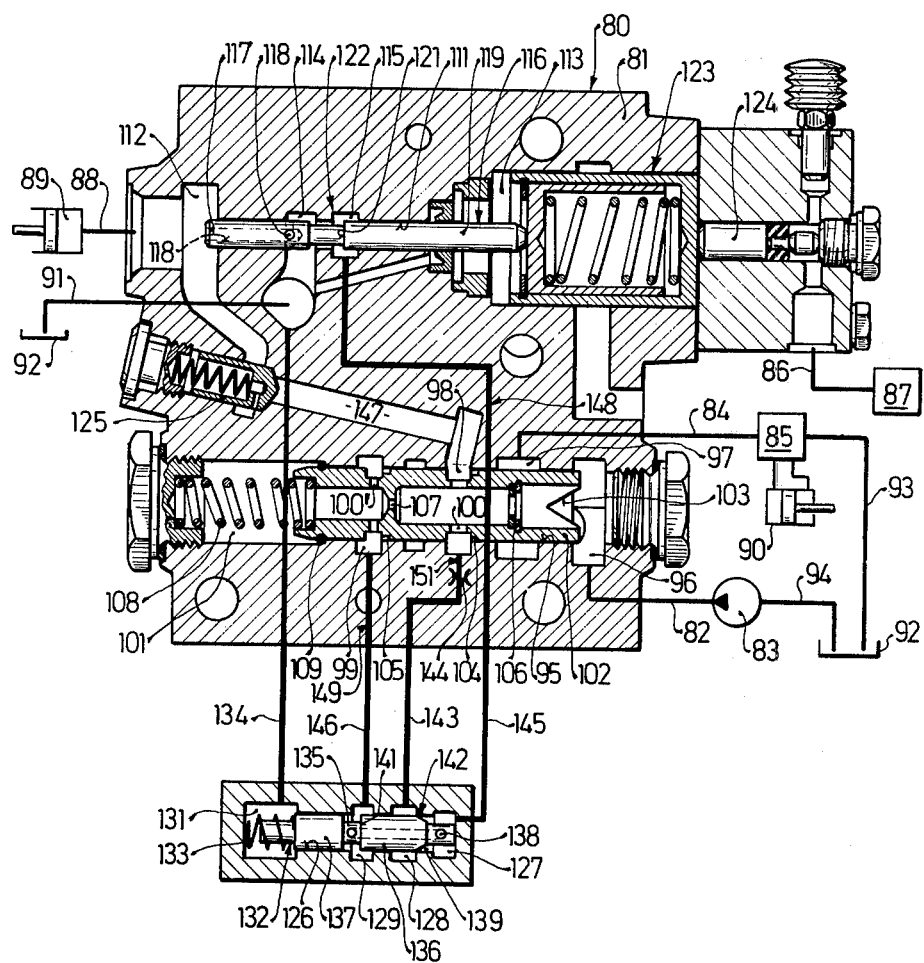
FIG. 3 is a partly sectioned, partly schematic illustration of a second embodiment according to the invention.

The control arrangement shown in FIG. 3 for a hydraulic brake of a trailer connected to a tractor has a housing 81. The housing 81 is connected by a feed conduit 82 to a pump 83, over a working conduit 84, with a multi-position valve 85, to a schematically illustrated consumer 90, over a signal conduit 86 with a hydraulic brake 87 for the tractor, over a brake conduit 88 with a braking cylinder 89 of the trailer, and over a return conduit 91 with a tank 92. A return conduit 93 leads also from the consumer to the tank and a suction conduit 94 leads from the tank to the pump 83.

The housing 81 is provided with a bore 95 which has a plurality of enlargements forming respectively an inlet chamber 96 communicating with the feed conduit 82, a consumer chamber 97 communicating with the working conduit 84, a brake chamber 98 communicating with the brake conduit 88, as well as a first control chamber 99 and a second control chamber 101. A hollow main control valve slide 102, arranged in the bore 95, has a first control edge 103 coordinated with the consumer chamber 97, a second control edge 104 coordinated with the braking chamber 98, as well as a third control edge 105 coordinated with the first control chamber 99. For this purpose the main control slide 102 has the necessary crossbores 100, respectively 100'. An orifice plate 106 is located in the interior of the main control valve slide 102 upstream of the second control edge 104 and a throttle 107 upstream of the third control edge 105. A spring 108 acting on the left end of the main control valve slide 102 presses a ring 109 fixed to the other surface of the main control valve slide against an abutment formed in the bore 95 so as to yieldably maintain the main control valve slide 102 in the position shown in FIG. 1.

The housing 81 is further provided with a second bore 111, the left end of which ends at a brake channel 112 and the right end of which ends at a space 113 formed in the housing 81, and the bore passes through a return chamber 114 and a control chamber 115 formed around the bore 111. A precontrol valve slide 116 is slidably arranged in the second bore 111 and the left piston section 117 of the precontrol valve slide 116 is formed in the interior thereof with bores 118 which, in the shown starting position, relieve pressure in the brake conduit 88 to the return chamber 114. The right piston section 119 of the precontrol valve slide 116 is provided with a control edge 121, which forms with the surrounding portion of the housing 81 a third adjustable throttle 122. This throttle 122 is fully opened in the illustrated starting position, in intermediate positions of the precontrol valve slide 116 in which the bores 118 are still closed, the throttle 122 is partly opened, and during further shifting of the precontrol valve slide 116 toward the left into a working position, the throttle 122 is completely closed. A pretensioned spring package 123 cooperating with a hydraulic positioning piston 124 abuts against the right end of the right piston section 119.

A check valve 125 is arranged in a pressure channel 147 providing communication between the brake chamber 98 and the brake conduit 88 and arranged to permit flow of pressure fluid through the pressure channel 147 into the brake conduit 88, while preventing flow of pressure fluid in the reverse direction through the pressure channel 147. The housing 81 is further provided with a third bore 126, which only for better illustration is flapped into the drawing plane. The bore 126 is provided with a plurality of annular enlargements which, in the sequence from right to left, form a first pressure chamber 127, a first annular space 128, a second annular space 129 and a second pressure chamber 131. A compression spring 133 is arranged in the second pressure chamber 131 which biases the auxiliary valve slide 132 in the bore 126 towards the right, and the second pressure chamber 131 is over a first channel 134 connected with the return chamber 114. An annular groove 135 in the auxiliary valve slide 132 separates a right piston section 136 from a left piston section 137 thereof. The annular groove 135 communicates through bores 138 in the auxiliary valve slide 132 with the first pressure chamber 127. The right piston section 136 has a first control edge 139 and a second control edge 141. The first control edge 139 forms a second adjustable throttle 142 between the first pressure chamber 127 and the first annular space 128. A second channel 143 leads from the brake chamber 98 over a first throttle 144 to the first annular space 128 at the auxiliary valve slide 132. From the first pressure chamber 127 of the auxiliary valve slide 132 leads a third channel 145 to the control chamber 115 at the precontrol valve slide 116. A fourth channel 146 connects the control chamber 99 at the main control valve slide 102 with the second annular space 129 at the auxiliary valve slide 132.

In this way a pressure channel 147 is provided in the housing 81 which leads from the feed conduit 82 over the main control valve slide 102 to the brake conduit 88. Control conduit means 148 leads from the pressure channel 147 over the main control valve slide 102, the auxiliary valve slide 132 and the precontrol valve slide 116 to the tank 92. The control conduit means 148 has thereby in the region between the main control valve slide 102 and the auxiliary valve slide 132 two branches, that is a first branch 149 which leads over the throttle 107 in the main control valve slide 132, the first control member 99, the fourth channel 146, the second annular space 129 in the bore 126, the annular groove 135, and the bores 138 in the auxiliary valve slide 132 to the first pressure chamber 127, whereas a second branch 151 leads parallel to the first branch 149 from the pressure channel 147 over the brake chamber 98, the second channel 143, the third throttle 144, the first annular space 128 and over the second throttle 142 into the first pressure chamber 127.

The control arrangement 80 above described will operate as follows:

If the precontrol valve slide 116 and the auxiliary valve slide 132 are in the position shown in FIG. 3, and the pump 83 delivers oil into the inlet chamber 96, an oil stream will flow over the first branch 149 of the control conduit means 148 to the tank 92. The second branch 151 of the control conduit means 148 is blocked by the auxiliary valve slide 132. The pressure difference at the throttle 107 will move the main control valve slide 102 against the force of the spring 108 towards the left, as viewed in FIG. 1, and the first control edge 103 opens thereby the connection between the inlet chamber 96 and the consumer chamber 97. The pump 83 will thereby act against a low circulation pressure if the valve 85 and the consumer 90 downstream of the valve 85 are not actuated. The spring 131 maintains thereby the auxiliary valve slide 132 in its right end position. The brake cylinder 89 of the trailer is thereby relieved of pressure over the bores 118 in the precontrol valve slide 116 toward the tank 92.

Figure 4:
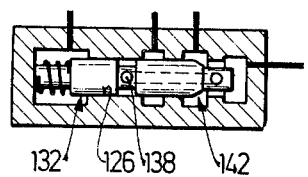
FIG. 4 is a longitudinal section through part of the arrangement illustrated in FIG. 3 shown in another end position.

If now the tractor brake 87 is actuated and a force proportional to the tractor brake force is applied over the positioning piston 124 and the spring packet 123 onto the right end of the precontrol valve slide 116, the latter will be moved towards the left, as viewed in FIG. 3. During such movement the bores 118 are first closed and subsequently thereto the control edge 121 on the precontrol valve slide 116 throttles the control fluid stream. During the gradual closing of the third throttle 122 the danger of an arresting throttling action exists, as described in principle already in connection with the control arrangement shown in FIG. 1. An immediate consequence of such arresting throttling is a pressure increase upstream of the third throttle 122. Such a pressure increase will increase also the pressure in the first pressure chamber 127. Since the second pressure chamber 131 is relieved of pressure, the spring 133 will yield at a certain control pressure and the auxiliary valve slide 132 will move to its left end position as shown in FIG. 4. Before the second control edge 141 during the leftward movement of the auxiliary valve slide 132 interrupts the first branch 149 of the control conduit means 148, the first control edge 139 with its chamfer will open the second branch 151 of the control conduit means 148, so that the pressure in the first pressure chamber 127 will be maintained. The auxiliary valve slide 132 will therefore continue its movement towards the left until its left end abuts in its left end position against a portion of the housing 81. The not-quite closed third throttle 122 will be inactive due to the complete closure of the first branch 149 of the control circuit means 148. No control fluid stream will pass over the throttle 107 and the spring 108 can therefore push the main control valve slide 102 towards the right. A partial fluid stream passing over the second branch 151, which is always greater than the mentioned control fluid stream, could upstream of the third throttle 122 only produce a pressure increase, which will fix the auxiliary valve slide 132 in its left end position as shown in FIG. 4. Even if the auxiliary valve slide 132 does not completely close the first branch 149, this would mean only that an insufficient pressure prevails in the first pressure chamber 127, that is, the control arrangement 81 is still far from a condition of an arresting throttling action. During the connection of the pump 83 with the brake cylinder 89 of the trailer an arresting throttling action is therefore impossible.

The main control valve slide 102 will therefore throttle more or less the connection between the feed conduit 82 and the working conduit 84 and consequently pressure fluid from the pump 83 will flow to an increasing extent from the brake chamber 98 through the pressure channel 147 to the brake cylinder 89 of the trailer. The braking pressure prevailing in the brake cylinder 89 will act on the precontrol valve slide 116 and is there compared with the desired value signal initiated by the hydraulic brake 87 of the tractor.

In the following the case is considered in which the force resulting from the braking pressure of the trailer and acting on the left end of the precontrol valve slide 116 is greater than the force acting on the right end of the precontrol valve slide and the connection from the pump 83 to the brake cylinder 89 of the trailer has to be again interrupted. The auxiliary valve slide 132 is in its left end position shown in FIG. 4, and the third throttle 122 will again be opened to an increasing extent as the control edge 121 of the precontrol valve slide 116 moves toward the right, if it has not remained partially opened, or reopened, if it has already been fully closed. Thereby the prevailing pressure in the control chamber 115, which usually corresponds to the trailer brake pressure, drops and therewith also the pressure in the first pressure chamber 127, because insufficient oil can flow over the first throttle 144 in the second branch 151 into the first pressure chamber 127. If the pressure in the first pressure chamber 127 now drops below a predetermined valve, the spring 133 pushes the auxiliary valve slide 132 from its left end position to its right end position, as shown in FIG. 3. During this movement toward the right, the auxiliary valve slide 132 closes the second throttle 142, whereby the pressure in the first pressure chamber 127 drops in an essentially increased manner, the more the first control edge 139 closes the second throttle. The auxiliary valve slide 132 can therefore during its movement from the left to the right end position not remain at standstill at an intermediate position, but must return to its right end position. Thereby the first branch 139 of the control conduit means 148 is opened by the second control edge 141 on the auxiliary slide 132, the pressure in the second control chamber 101 will collapse and the main control valve slide 102 will move against the force of the spring 108 toward the left. Thereby the inlet chamber 96 is again connected to the consumer chamber 97 and the pressure of the pump will be reduced. At the same time the connection to the brake chamber 98 will be closed. The check valve 125 will prevent outflow of fluid from the brake cylinder 89 of the trailer and the bores 118 in the precontrol valve slide 116 are still closed so that the pressure in the brake cylinder 89 of the trailer will be maintained. A control fluid stream will again flow over the first branch 149 of the central conduit means 148 to the tank 92.

In order to relieve pressure from the brake cylinder 89, the precontrol valve slide 116 connects, during its further movement towards the right, the brake conduit 88 over the thus-opened bores 118 with the return flow chamber 114.

The auxiliary valve slide acts therefore during a pressure build-up phase above a predetermined pressure as a pressure switch. During a pressure reduction phase, that is during interruption of the connection from the pump 83 to the brake cylinder 89, the auxiliary valve slide 132 acts as a kind of reversely poled stream regulating slide, to which the third throttle 132 is coordinated as a resistor, and which will act as a toggle switch. In any case an arresting throttling action will be positively prevented.

It is therewith possible to construct the precontrol valve slide 116 in a simple manner in which fewer dimensions appear critical.

It will be understood that each of the elements described above, or two or more together, may also find a useful application in control arrangements for hydraulic power transmissions, differing from the types described above.

While the invention has been illustrated and described as embodied in a control arrangement for a hydraulic power transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a control arrangement for a hydraulic power transmission, a combination comprising housing means; a pressure channel formed in said housing means; a pump communicating with one end of said pressure channel; cylinder-and-piston means communicating with the other end of said pressure channel; main control valve slide means and precontrol valve slide means cooperating therewith for controlling flow of fluid through said pressure channel; control conduit means branching off from said pressure channel; a first throttle in said control conduit means; a bore in said housing having a first and a second pressure chamber at opposite ends and forming with said pressure chambers part of said control conduit means; auxiliary valve slide means axially movable in said bore between two end positions for controlling flow of fluid through said control conduit means; a spring in one of said pressure chambers urging said auxiliary valve slide means to one of said end positions, said auxiliary valve slide means being moved to the other of said end positions when the fluid pressure in the other pressure chamber exceeds a force imparted to said auxiliary valve slide means by the fluid pressure in said one pressure chamber and the spring, said precontrol valve slide means and said auxiliary valve slide means forming a pair of adjustable throttles arranged in said control conduit means in such a manner that when the throttling action produced by one of said adjustable throttles increases, the throttling action produced by the other adjustable throttle decreases, and vice versa; said control conduit means including a section between said two adjustable throttles which communicates with said first pressure chamber.

2. A combination as defined in claim 1, wherein said spring is arranged to act on said auxiliary valve slide means in such a manner that, during reduction of pressure in said pressure channel, said auxiliary valve slide means is moved to one of its end positions in which the fluid stream passing through said control conduit means is at least temporarily interrupted.

3. A combination as defined in claim 1, and including mechanical means for moving said precontrol valve slide means in axial direction; a working conduit between the other end of said pressure channel and said cylinder-and-piston means; and a return conduit, said precontrol valve slide means being formed with an axially extending blind bore having a closed end and said main control valve slide means being located in said blind bore to form between said closed end of said blind bore and one end of said main valve slide means a control chamber, said main control slide means being axially movable in said blind bore between at least two end positions depending on the fluid pressure in said control chamber to provide in a neutral position of said control arrangement substantially pressureless circulation of the fluid pumped by the pump from said pressure channel to said return conduit and in other positions of said control arrangement a connection between said pressure channel and said working conduit, respectively and a connection between said working conduit and said return conduit, said precontrol valve slide means being provided on its outer periphery with an annular groove forming a first and a second control edge, said first control edge, forming one of said adjustable throttles and being arranged to control flow of fluid from said control chamber to said return conduit, said first throttle being located in said control conduit means upstream of said first control edge; a channel leading from said control conduit means between said first control edge and said first throttle to said second pressure chamber of said auxiliary valve slide means and said control conduit means leading downstream of said first control edge over the other adjustable throttle, formed by said auxiliary valve slide means, to said return conduit; said control conduit including passage means connecting said other adjustable throttle in parallel to said second control edge; and further passage means providing communication between said first pressure chamber of said auxiliary valve slide means in the region of said control conduit means between said one and said other adjustable throttles, said spring being located in said first pressure chamber.

4. A combination as defined in claim 3, and including a further bore in said housing means in which said precontrol valve slide means is axially movable, said further bore having an annular chamber between said first throttle and said first control edge, said bore in which said auxiliary slide means is axially movable being provided with four annular enlargements extending outwardly from the inner surface thereof, two of said annular enlargements located at opposite ends of said bore constituting said first and said second pressure chambers, said control conduit means including a channel connecting the annular enlargement adjacent said first pressure chamber with said return conduit and a further channel connecting the annular enlargement adjacent said second pressure chamber with said annular chamber of said further bore; and bores in said auxiliary valve slide means providing communication between said first pressure chamber and an annular groove on said auxiliary slide means coordinated with said other adjustable throttle.

5. A combination as defined in claim 4, wherein said auxiliary valve slide means has opposite end faces of equal areas respectively located in said first and said second pressure chamber, and a portion which, in any position of said auxiliary valve slide means, prevents communication between said second pressure chamber and the annular enlargement adjacent thereto.

6. A combination as defined in claim 1, wherein said cylinder-and-piston means constitute part of a hydraulic brake of a trailer, and including a further hydraulic brake, and a hydraulic consumer on a tractor for the trailer, and a brake conduit communicating at one end with said hydraulic brake of said trailer; an inlet chamber between said pump and said main control valve slide means, a first outlet means coordinated with said main control valve slide means and connected to said hydraulic consumer, second outlet means coordinated with said main control valve slide means and connected to said brake conduit, a spring acting on one end of said main control valve slide means and the latter being movable against the force of said spring to a position in which said main control valve slide means establishes a connection between said inlet chamber and said first outlet means while interrupting the connection between said inlet chamber and said second outlet means, and said main control valve slide means being biased by said spring toward another position in which said main control valve slide means interrupts the connection between said inlet chamber and said hydraulic consumer while connecting said inlet chamber with said second outlet means; a further throttle in said control conduit means, said main control valve slide means being axially movable in a further bore in said housing means and said further bore forming about said main control valve slide means a first control chamber and at one end of said further bore a second control chamber communicating with said control conduit means downstream of said further throttle and the fluid pressure in said second control chamber acting on said main control valve slide means in the same direction as said spring; a return conduit; passage means connecting said hydraulic brake of said trailer with said return conduit, said precontrol valve slide means controlling flow of fluid through said passage means and being acted upon by forces depending on the forces acting on said hydraulic brakes on said trailer and on the tractor, said auxiliary valve slide means having a first control edge forming one of said adjustable throttles for controlling a first connection from said pressure channel to said first pressure chamber and a second control edge for controlling a second connection between said first control chamber and said first pressure chamber said spring acting on said auxiliary valve slide being located in said second pressure chamber to bias said auxiliary valve slide means to an end position interrupting said second connection and establishing said first connection.

7. A combination as defined in claim 6, wherein said bore in which said auxiliary valve slide means is axially movable is provided with four annular enlargements extending outwardly from the inner surface thereof, two of said annular enlargements located at opposite ends of said bore constituting said first and said second pressure chambers, a third annular enlargement adjacent said first pressure chamber being connected by a branch of said control conduit means to said first control chamber, said first throttle being located in said branch, and including an annular groove in said auxiliary valve slide means bordered at one end by said second control edge, and bores in said auxiliary valve slide means connecting said annular groove in said auxiliary valve slide means with said first pressure chamber.

8. A combination as defined in claim 7, wherein the distance between said first and said second control edge on said auxiliary valve slide means is less than the distance of the edges of the related annular enlargements in said bore.

* * * * *